COMBINATION REPORTING AND SUBSCRIBER TELEPHONE

Filed Dec. 31, 1968 6 Sheets-Sheet 1

INVENTOR
L. D. TATE
BY [signature]
ATTORNEY

Oct. 27, 1970 L. D. TATE 3,536,853

COMBINATION REPORTING AND SUBSCRIBER TELEPHONE

Filed Dec. 31, 1968 6 Sheets-Sheet 5

United States Patent Office 3,536,853
Patented Oct. 27, 1970

3,536,853
COMBINATION REPORTING AND SUBSCRIBER TELEPHONE

Louis D. Tate, Fairland, Ind., assignor to Bell Telephone Laboratories, Incorporated, Murray Hill and Berkeley Heights, N.J., a corporation of New York Filed Dec. 31, 1968, Ser. No. 788,122
Int. Cl. H04m 1/51
U.S. Cl. 179—90 10 Claims

ABSTRACT OF THE DISCLOSURE

The functions of an automatic reporting telephone and a conventional subscriber telephone are combined in an integral unit by dual function utilization of the speech network, the pushbutton dial and the telephone ringer.

BACKGROUND OF THE INVENTION

Field of the invention

This invention relates to automatic reporting telephones which include the function of reporting out through the switched telephone network the existence of some preselected condition.

Description of the prior art

Automatic reporting telephones of the general type indicated are in widespread use, particularly for industrial applications such as monitoring the operating conditions at remote pumping stations for oil and gas distribution systems, reporting the operating conditions of other unattended industrial machinery and reporting the existence of emergency conditions such as fire or unauthorized entry. In one illustrative set, two modes of operation are provided, alarm and inquiry. The alarm mode of operation is initiated by the occurrence of some preselected condition and consists of a dialing period, a waiting period and a reporting period. During the dialing period, the set seizes the telephone line and after a several second delay for dial tone, dials the telephone number of the supervisory station. For the balance of the time remaining in the dialing period, the set transmits a prerecorded message that gives the location of the set and the condition that has occurred. During the waiting period, the reporting set transmits an audible signal that serves to identify the set, should the supervisory station answer during this time, and finally, during the reporting period, the set again transmits the prerecorded message. Bursts of the identification signal are superimposed upon the recorded message if the predetermined condition continues while the message is being transmitted.

The supervisory station exercises control over the reporting set by means of a supervisory signal. If the signal is sent during the wating period, the period is terminated and the reporting period is initiated. If the supervisory signal is sent during the dialing period or the reporting period, the set disconnects from the telephone line and resets to a standby condition. If, on the other hand, the supervisory signal is not sent during either the dialing or the reporting periods, the set disconnects from the telephone line at the end of the reporting period, waits, then repeats the aforedescribed sequence some preselected number of times, and finally resets to a standby condition.

The inquiry mode of operation of the reporting set is initiated by an incoming call. After several rings, the reporting set connects to the telephone line and transmits the identification signal for a short duration. If the supervisory signal is not sent during this time, the reporting set disconnects from the telephone line and resets to a standby condition. If, however, the supervisory signal is sent during this time, transmission of the identification signal ceases and the reporting period of the alarm mode of operation commences. Thus the prerecorded message is transmitted and if the supervisory signal is sent, the reporting set is reset to a standby condition. Otherwise, it disconnects from the telephone line and after a short delay proceeds with the entire alarm mode of operation. If the predetermined condition exists as of the time the prerecorded message is transmitted, bursts of the identification signal are again superimposed thereon.

A set of the type described is disclosed by J. F. Ritchey et al. in a copending patent application Ser. No. 554,431, filed June 1, 1966. Another example of a somewhat similar automatic alarm reporting set is shown in U.S. Pat. 2,827,515 issued by F. Zuber, Mar. 18, 1958. Compared to conventional telephone sets, automatic reporting sets are obviously extremely complex and the cost, both for manufacture and installation, is correspondingly high. Despite this complexity and cost, however, prior art sets of the type indicated are not designed to provide the simple function of a conventional telephone set. Heretofore, whenever conventional telephone service has been required in addition to the automatic reporting function, a separate conventional subscriber set has been employed.

It is evident from the foregoing that automatic reporting telephone sets of the type indicated are unsuitable, if only from the standpoint of economics, if the performance of only a very simple alarm reporting function is desired such as the simple ringing of a distant station in response to an alarm condition. Accordingly, a broad object of the invention is to simplify automatic reporting telephone sets and to reduce the cost of providing the combination of a simple automatic reporting telephone function with a conventional telephone set function.

SUMMARY OF THE INVENTION

The stated object and additional objects are achieved in accordance with the principles of the invention by an automatic telephone set which also operates as a conventional telephone set. A simple preset one-number-dialer mechanism responsive to a preselected condition is employed to place the call and to signal the called party by means of repeat dialing. The set is reset to its nonalarm or standby mode simply by calling back at a specified time. Memory of the alarm mode is supplied simply and economically by means of a magnetic latching relay. Additional economy is achieved by making joint use of the conventional telephone components, including the dial, the speech network and the ringer, for the reporting function and for the conventional telephone function. The pushbutton dial is programmed to operate over a timed sequence which permits the generated signals to be used first, conventionally, to initiate the establishment of a connection through the switched network and secondly, to continue for a preselected period of time after the answering party has gone off-hook so that the dial signal becomes a distinctive alerting signal. In accordance with another feature of the invention, a set of contacts associated with the ringer is operated by the ringer to restore the set to its nonalarm mode.

DETAILED DESCRIPTION

Figure 1:
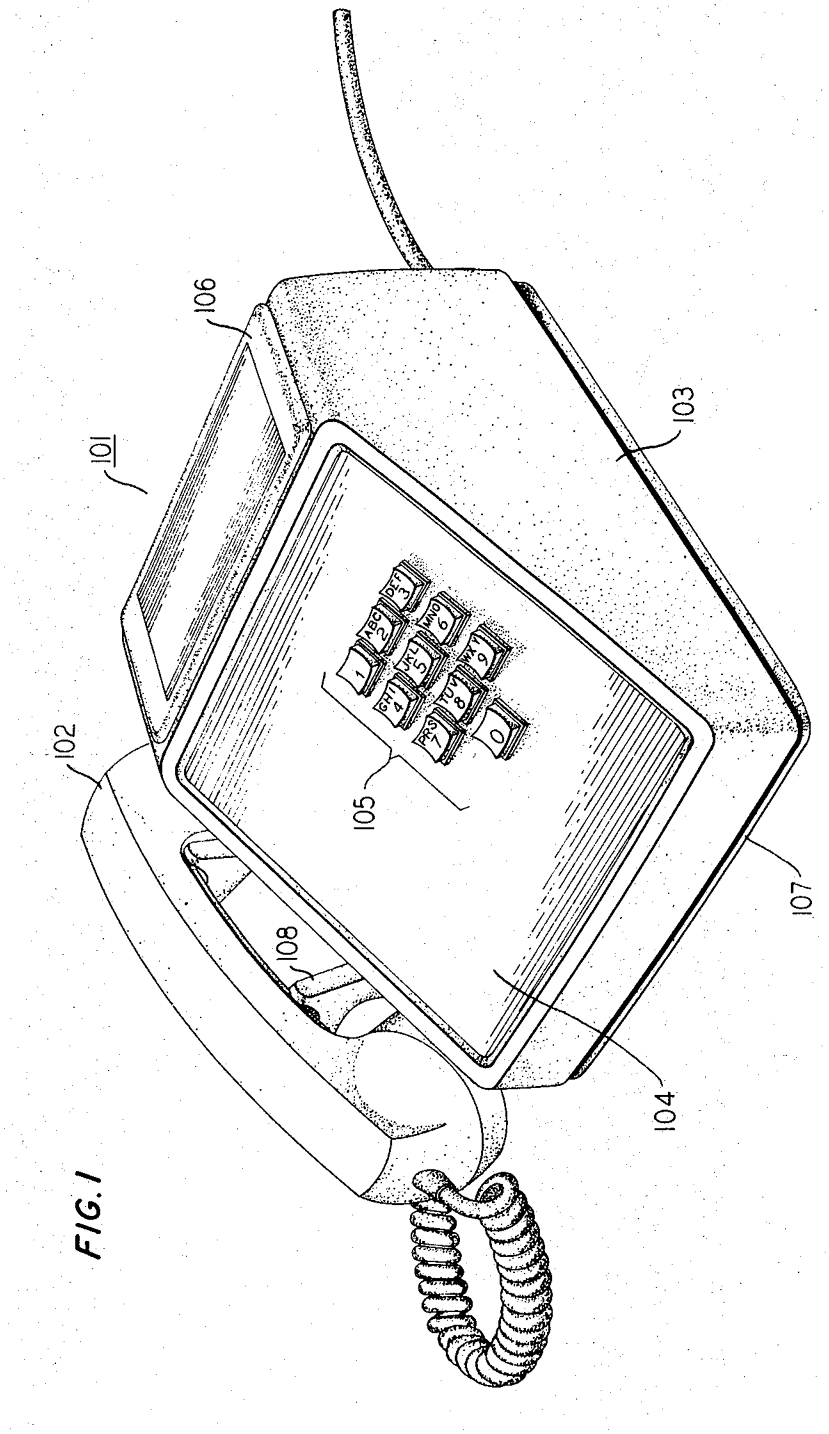
FIG. 1 is a perspective view of the outside of a set in accordance with the invention.

As shown in FIG. 1, insofar as outward appearance is concerned a set 101 in accordance with the invention resembles a conventional multifrequency signaling subscriber's telephone set. As seen from the outside, major structural elements include: a base member 107, a housing cover 103, a front cover 104, a top cover 106, and a pushbutton dial assembly 105. On the left side of the set 101 a handset 102 is conventionally mounted on a cradle 108.

Figure 2:
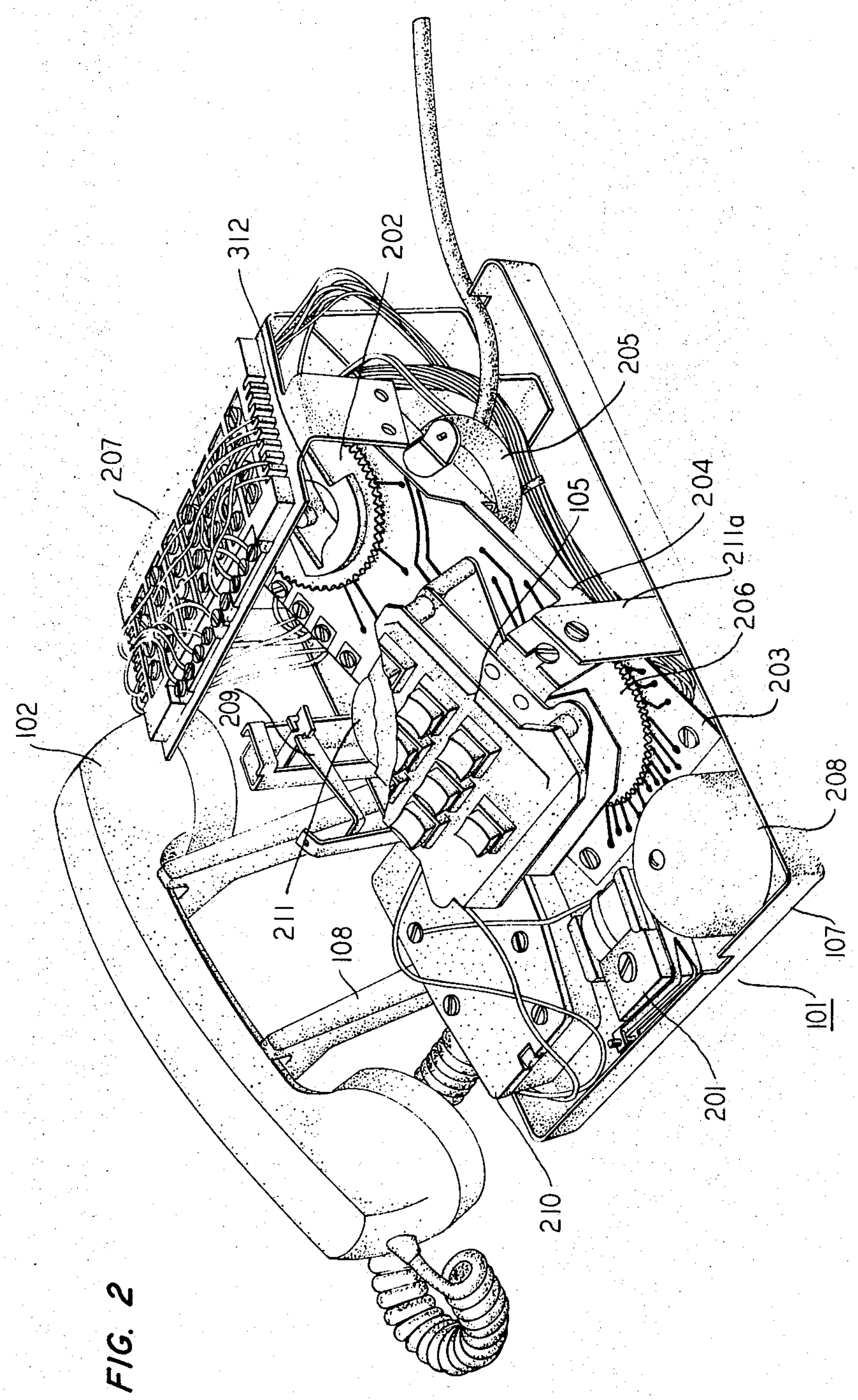
FIG. 2 is the set shown in FIG. 1 with the cover members removed.

Removal of the covers 103, 104 and 106, as shown in FIG. 2, discloses that all of the major structural elements of the set are mounted on the base member 107. A bracket 211 provides support for a dialer-sequencer frame member 204, shown in detail in FIG. 3B, which is inclined at an angle with respect to the base 107. The dialer-sequencer frame 204 in turn supports a dialer-sequencer circuit board 203, shown in detail in FIG. 3A, and retains it in place by the side tabs 301, 302 and 303. Mounted above the upper portion of the dialer-sequencer board 203 is a sequencer wheel 206, shown in detail in FIG. 3D, which includes brush contacts 310 which selectively contact portions of a commutator 203B. The sequencer wheel 206 is driven by a sequencer motor 205 mounted underneath the dialer-sequencer frame 204.

Figure 3C:
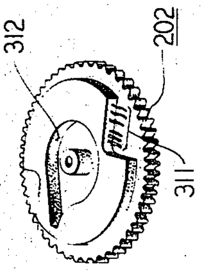
FIG. 3C is a perspective view of the dialer wheel shown partially in FIG. 2.

A dialer wheel 202 driven by a dialer motor 211 is mounted above the lower portion of the circuit board 203 and below the pushbutton dial assembly 105. As shown in FIG. 3C, the dialer wheel 202 includes brush contacts 311 which selectively contact circuit paths on the commutator 203A as the dialer wheel 202 is rotated.

Other elements shown in FIG. 2 include a number coding terminal board 207 which is connected in accordance with the preselected telephone number which the set is designed to dial out automatically. The number coding terminal board 207 is interconnected with the circuit shown in FIG. 4B in a manner described in greater detail hereinbelow. A switch hook assembly 209 is mounted on the left side of the base 107, and a housing 210 for the elements of the telephone set network is shown mounted on the lower left corner of the base 107. A bell 208 is mounted on the lower right corner of the housing 107, and a ringer assembly 201 which includes the elements for activating the bell 208 is mounted adjacent thereto.

An examination of certain additional features of the structural elements included in a set in accordance with the invention will serve as a useful preface to a detailed discussion of a complete operating sequence. As indicated above, the brush contacts 310 of the sequencer wheel 206, shown in FIG. 3D, and the brush contacts 311 of the dialer wheel 202, shown in FIG. 3C, operate in combination with respective commutators 203A and 203B, shown in FIG. 3A, which are mounted on the common circuit board 203. The dialer wheel 202 has a cam surface 312 molded into it which operates the multifrequency dial common switch, by means of a cam follower, not shown. It is the dialer brush 311 which initiates and controls the generation of the preprogrammed telephone number. The dialer wheel 202 is driven at a fixed speed, such as 30 r.p.m. for example, through reduction gears, not shown, from the dialer motor 211.

Figure 3D:
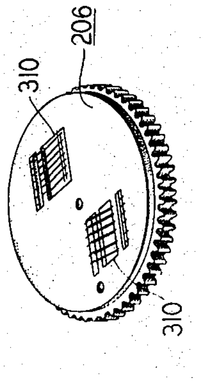
FIG. 3D is a perspective view of the sequencer wheel shown partially in FIG. 2.
Figure 3B:
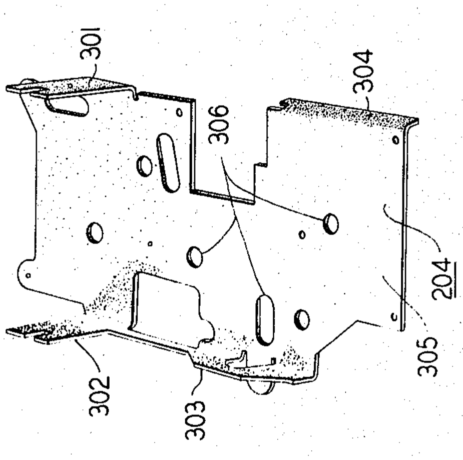
FIG. 3B is a perspective view of the dialer-sequencer frame also shown partially in FIG. 2.
Figure 3A:
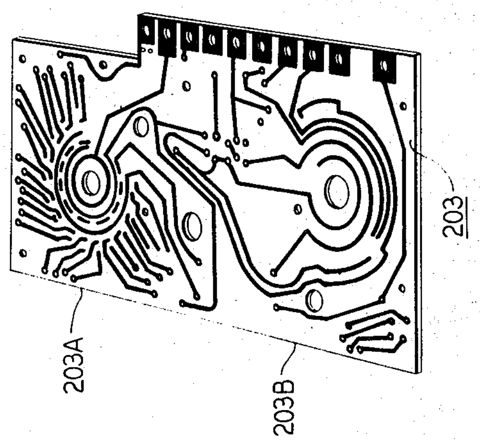
FIG. 3A is a perspective view of the dialer-sequencer circuit board shown partially in FIG. 2.

Similarly the sequencer wheel 206, FIG. 3D, is driven by the motor 205 by way of reduction gears, not shown, which mesh with the toothed periphery of the wheel.

Figure 4A:
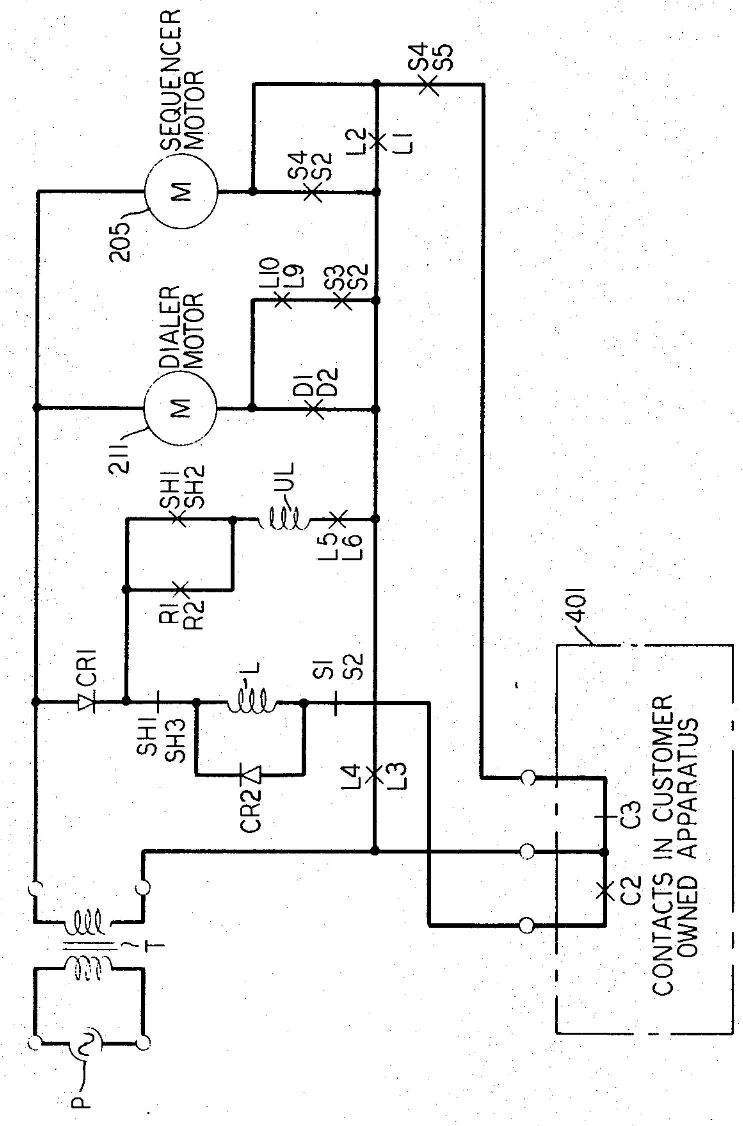
FIG. 4A is a schematic circuit diagram of the control circuit employed in a set in accordance with the invention.

A complete operating sequence of the set is initiated by the actuation of the alarm-condition transfer contacts C2–C3, which are included in the customer-owned apparatus 401 shown in FIG. 4A. Such apparatus may comprise any one of a number of conventional alarm devices which operate in response to an unauthorized entry such as the opening of a window or the like, or in response to the presence of smoke or excessive temperature. With the operation of the contacts C2–C3, a conducting path is established through a latching relay L by way of the normally closed S1–S2 sequencer wheel contacts, thus latching the L relay. All sequencer contacts are designated "S," dialer wheel contacts are designated "D" and L relay contacts are designated "L." The S1–S2 contacts are closed only at the "true" home position of the sequencer wheel 206. The latching or L relay is operated from pulsating D.C. current derived from an A.C. source P and rectified by a diode CR1. Clamping or fly-wheel action is provided by a diode CR2.

With the latching-up of the L relay, all normally open L contacts are closed. A power supply path for the sequencer motor 205 is established through contacts L1–L2. With the rotation of the sequencer wheel 206, the sequencer contacts S6–S7, FIG. 4B, close which causes the telephone line to be seized by way of a path which includes the contacts L7–L8, and at approximately the same time the latching path through contacts S1–S2, FIG. 4A, is disconnected.

After a brief wait for dial tone, which may be on the order of four seconds, the dialer motor 211 is started through the contacts S2–S3 and L9–L10. The S2–S3 contacts operate early in the cycle to cause the dialer motor 211 to run which in turn initiates the dialing out of the preprogrammed number. Later in the operating cycle, it will be noted that the dialer motor 211 is restarted for the purpose of repetitively dialing out the preprogrammed number for the purpose of providing a distinctive tone to the called set, which serves to identify the calling set as a location where a specific condition, emergency or otherwise, exists.

After the dialer wheel 202 has dialed the number a single time, it returns to its normal or "home" position under control of the D1–D2 contacts. Approximately ten seconds are allowed for the central office to process the call during which period the dialer remains at rest. At the termination of this period the S2–S3 contacts close again and cause the dialer to run continuously for an extended time such as twenty-nine seconds, for example, and the telephone number is dialed repetitively during that period. After this period of continuous dialing, the S2–S3 contacts open, allowing the dialer to return to its "home" position under the control of the D1–D2 contacts. Simultaneously, the sequencer wheel contacts S6–S7 open, dropping the line. The sequencer 206 continues to run, however, for some extended period, such as forty-five seconds for example, after which time the telephone line is again seized by the operation of the S6–S7 sequencer contacts, and the entire operation is repeated. This sequence of calling and "hanging-up" continues indefinitely until the set is restored to its nonalarm mode.

The customer at the called location may restore the alarm generating set to the nonalarm mode by calling back during one of the forty-five second intervals during which the alarm set is in effect on-hook. A set of contacts R1–R2 responsive to the operation of the ringer 201 causes a path for the L relay unlatching winding UL to be established, which path also includes the contacts L5–L6. The unlatching of the L relay restores the set to its nonalarm mode.

If the contacts in the customer-owned apparatus 401 remain in the alarm condition after the L relay is unlatched, the sequencer 206 will continue to run until the sequencer contacts S2–S4 open at an intermediate position, slightly short of the sequencer "home" position. At this point, the set is fully usable as a conventional telephone set and will not take further action in response to an alarm condition presented by the customer-owned apparatus 401. Should the customer contacts C2–C3 revert to their normal or nonalarm condition, however, a path will be established through the C3 and S4–S5 contacts and cause the sequencer 206 to run to its "home" position, at which time the set is ready to report additional alarms.

The set also may be restored to its nonalarm mode at any time during its operating cycle if the customer lifts the handset off-hook. This action establishes a path through the switch hook contacts SH1–SH2 and the L relay contacts L5–L6, thus causing the L relay to unlatch to the nonalarm mode. The sequencer 206 runs either to its intermediate position, as previously described, or to its "home" position, depending upon the state of the customer contacts C2 and C3. The dialer wheel 202 runs to its "home" position under the control of the D1–D2 dialer contacts. The set is at that point usable in the conventional fashion. If, however, the customer had gone off-hook during the "off-hook" portion of the reporting mode, it would be necessary for him to hang up and go off-hook again in order to secure dial tone.

Figure 4B:
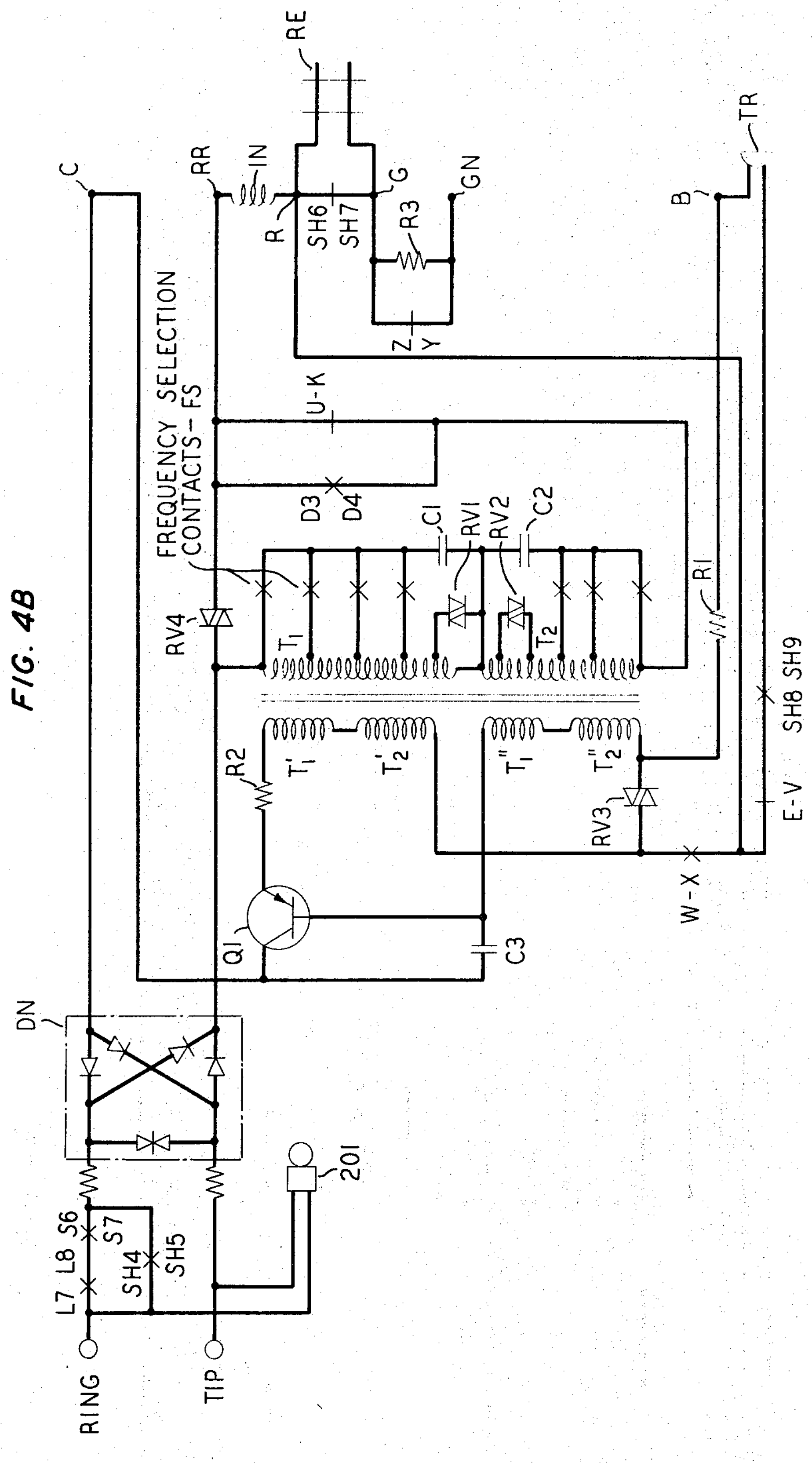
FIG. 4B is a schematic circuit diagram of the dial signal generating circuit and a part of the speech network employed in a set in accordance with the invention.

Switch hook contacts SH8–SH9, FIG. 4B, open the transmitter circuitry any time the handset is on-hook, thereby preventing loss of customer privacy during the reporting mode. Switch hook contacts SH6–SH7 prevent the acoustic transmission of multifrequency dialing signals into the room during the alarm operation.

Although use of the circuit of FIG. 4B is made in connection with the automatic alarm functions already noted, the major portion of the circuit is conventional in that it comprises a multifrequency dial signal generator circuit in combination with a telephone speech network (only a portion of which is shown) of the type employed commercially in multifrequency signaling subscriber sets. The SH4–SH5 contacts are the normal switch hook contacts provided for seizing the line when normal telephone set service is desired, and the SH6–SH7 switch hook contacts provide receiver muting for the receiver RE to prevent clicks in the receiver when going on- or off-hook, and also to prevent the audible transmission of tones when the set is in the alarm mode.

The diode network DN is conventional and provides polarity guard action. The active element of the tone generating network is a transistor Q1 with conventional emitter-to-base coupling provided by the coils $T_1'$, $T_2'$, $T_1''$ and $T_2''$. In normal dial operation actuation of the dial frequency selection contacts FS by conventional pushbuttons selects the appropriate taps on the coils $T_1$ and $T_2$ which in combination with the capacitors C1 and C2 determine the signaling frequencies.

When automatic dial operation is called for by the presence of an alarm condition, the D3–D4 contacts are operated to provide for dial excitation. The D6–D7 and D5–D8 contacts are paralleled with the FS contacts and are shown, for illustrative purposes, connected to provide for the automatic dialing of a particular digit. The programming of other digits is effected in a straightforward manner by suitable wiring through the number coding terminal board 207, shown in FIG. 2.

The Z–Y, W–X, E–V and U–K contacts are operated by the conventional dial common switch, not shown. Whenever the dialer wheel 202, FIG. 3C, runs, however, these contacts are operated to the off-normal condition for the duration of the dialing interval by a simple operating lever or cam follower, not shown, which is driven by the cam surface 312 which is molded into the center portion of the dialer wheel 202. Other conventional portions of the speech network not shown would, in a complete circuit, be connected to the terminals B, G, RR and C.

Figure 5A:
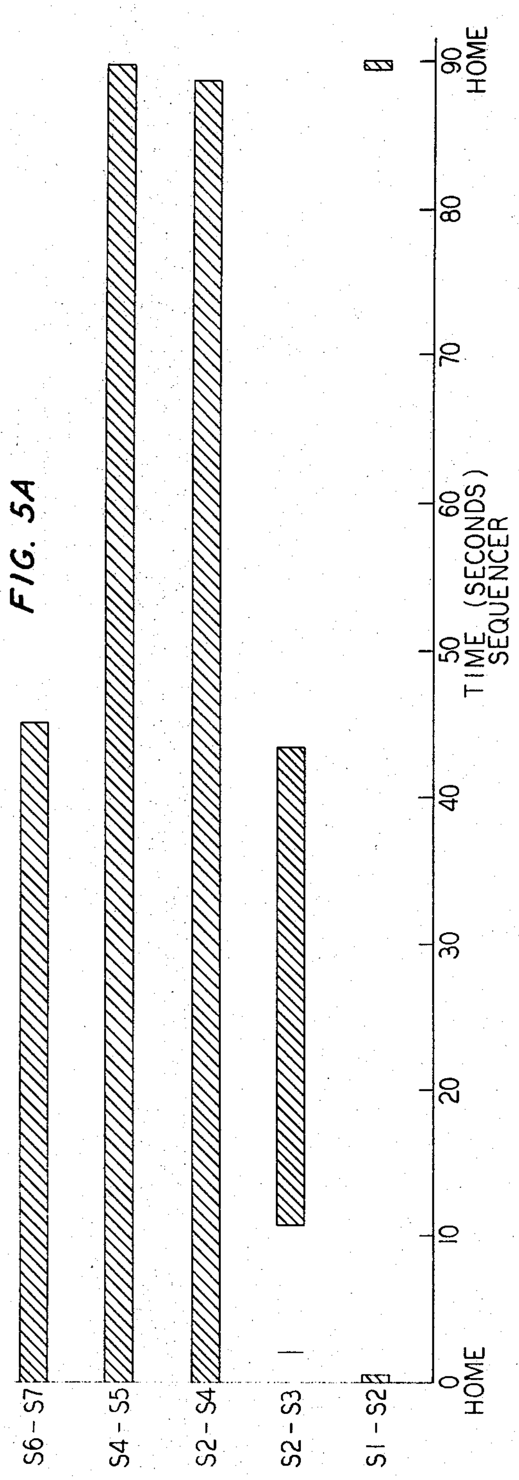
FIG. 5A is a time plot illustrating the operating pattern of the sequencer wheel shown in FIG. 3D.
Figure 5B:
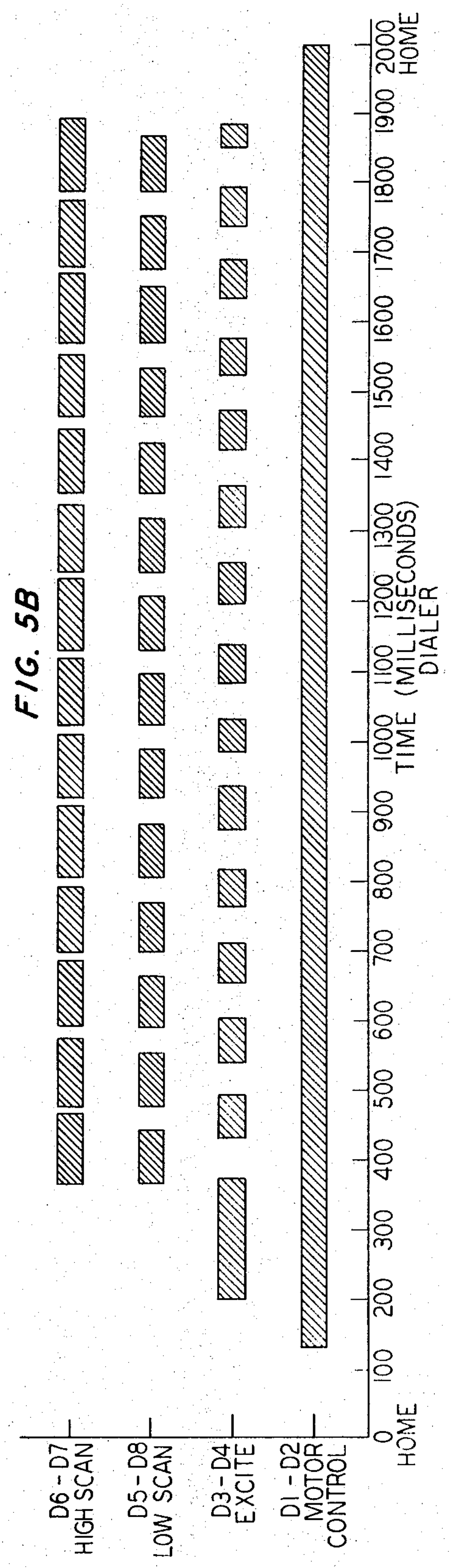
FIG. 5B is a time plot of the operation of the dialer wheel of FIG. 3C.

The charts shown in FIGS. 5A and 5B illustrate the sequence and time of operation for the contacts indicated on the sequencer wheel and on the dialer wheel respectively.

It is to be understood that the embodiment described herein is merely illustrative of the principles of the invention. Various modifications thereto may be effected by persons skilled in the art without departing from the spirit and scope of the invention.

What is claimed is:

1. A combination reporting and subscriber telephone set comprising, a multifrequency signal generating dial, first means responsive to a perselected condition for causing said dial automatically to dial out a preselected directory number repetitively in a preselected time sequence, a telephone ringer, and second means including said ringer responsive to an incoming call for terminating the operation of said first means and for returning said first means to a rest condition.

2. A dual function reporting and subscriber telephone set comprising, in combination, a manually operable multifrequency signal generating dial, first means responsive to a preselected condition for causing said dial automatically to dial out a preselected directory number repetitively for a preselected period which continues after the called set is placed in the off-hook condition, thereby to enable the signals corresponding to said directory number to serve a dual function of effecting a connection through a switched telephone network to a called station and of identifying said set to said station, a telephone ringer, and second means including said ringer responsive to an incoming call for resetting said first means to a non-alarm mode.

3. Apparatus in accordance with claim 2 wherein said first means includes a first set of contacts driven by a first motor for controlling the sequence of operation of said set, a second set of contacts driven by a second motor for controlling the automatic operation of said dial, first and second commutator means in selective conductive relation, respectively, with said first and second contacts, a switch hook, and means responsive to the placing of said switch hook in an off-hook condition for resetting said first means to an alarm-responsive condition.

4. A dual function reporting and subscriber telephone set comprising, in combination, manually operable multifrequency signal generating dial, first means responsive to a preselected condition for automatically and repetitively effecting a sequence of actions that includes, in order, seizing a telephone line, dialing out a preselected directory number once to effect a through connection to a distant station, dialing out said number repetitively for a first preselected period as a signal identifying the location of said condition and disconnecting from said telephone line, a ringer, and means responsive to the operation of said ringer for restoring said first means to a nonalarm mode.

5. Apparatus in accordance with claim 4 including a switch hook and means responsive to the operation of said switch hook for seizing a telephone line thereby to provide normal telephone service.

6. Apparatus in accordance with claim 4 wherein said first means includes a first set of motor driven brush contacts for controlling the sequence of operation of said set, a second set of motor driven brush contacts for controlling the automatic operation of said dial, and first and second commutator means in selective conductive relation, respectively, with said first and second brush contacts.

7. A dual function reporting and subscriber telephone set comprising, in combination, a manually operable multifrequency signal generating dial, first means responsive to a preselected condition for automatically and repetitively effecting a sequence of actions that includes, in order, seizing a telephone line, dialing out a preselected directory number once, continued seizure of said line for a first period without dialing, repetitive dialing out of said number for a second period, dropping said line and remaining in a non-line-seized condition for a third period, a ringer, and means responsive to the operation of said ringer during said third period for placing said set in a non-alarm mode.

8. Apparatus in accordance with claim 7 including a switch hook and means responsive to the operation of said switch hook for placing said set in a non-alarm mode thereby to make normal telephone service available.

9. Apparatus in accordance with claim 7 including a telephone voice network wherein a portion of said network provides a second function as a portion of said first means.

10. A dual function reporting and subscriber telephone set comprising, in combination, a manually operable multifrequency signal generating dial, means responsive to a preselected condition for automatically dialing out a preselected number, pausing for a first preselected period, repetitively dialing out said number for a second period irrespective of an off-hook condition at the called station, shifting said set to an on-hook condition for a third preselected period and for repeating said dialing-pausing-repetitive dialing and off-hook condition sequence so long as said condition persists, a ringer, and means responsive to the operation of said ringer during said third period for shifting said set to a non-alarm mode of operation.

No references cited.

KATHLEEN H. CLAFFY, Primary Examiner

T. J. D'AMICO, Assistant Examiner

U.S. Cl. X.R.

179—2, 5